United States Patent
Uchida

(10) Patent No.: US 8,691,443 B2
(45) Date of Patent: Apr. 8, 2014

(54) LITHIUM-ION SECONDARY BATTERY AND METHOD OF MANUFACTURING SAME

(75) Inventor: Yozo Uchida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 136 days.

(21) Appl. No.: 12/989,087

(22) PCT Filed: Jan. 14, 2009

(86) PCT No.: PCT/JP2009/050396
§ 371 (c)(1),
(2), (4) Date: Oct. 22, 2010

(87) PCT Pub. No.: WO2010/082323
PCT Pub. Date: Jul. 22, 2010

(65) Prior Publication Data
US 2011/0236759 A1    Sep. 29, 2011

(51) Int. Cl.
*H01M 4/583* (2010.01)
*H01M 2/16* (2006.01)
*H01M 4/04* (2006.01)
*H01M 10/0585* (2010.01)

(52) U.S. Cl.
CPC ................ *H01M 2/1646* (2013.01);
*H01M 10/0585* (2013.01)
USPC ........................ 429/231.8; 429/246

(58) Field of Classification Search
CPC ................ H01M 2/1646; H01M 10/0585
USPC .............................. 429/231.8, 246
See application file for complete search history.

(56) References Cited

U.S. PATENT DOCUMENTS

| | | | | |
|---|---|---|---|---|
| 2001/0008728 | A1* | 7/2001 | Turner et al. | 429/218.1 |
| 2003/0138698 | A1* | 7/2003 | Lee et al. | 429/231.8 |
| 2008/0248387 | A1* | 10/2008 | Hinoki et al. | 429/209 |
| 2008/0318133 | A1 | 12/2008 | Matsuyama et al. | |
| 2010/0285362 | A1* | 11/2010 | Christensen et al. | 429/231.95 |

FOREIGN PATENT DOCUMENTS

| | | |
|---|---|---|
| CN | 101330138 | 12/2008 |
| JP | 6-36800 | 2/1994 |
| JP | 2000-164207 | 6/2000 |
| JP | 2001-126727 | 5/2001 |
| JP | 2002-231221 | 8/2002 |
| JP | 2003-238156 | 8/2003 |
| JP | 2004-185865 | 7/2004 |

(Continued)

OTHER PUBLICATIONS

International Search Report in International Application No. PCT/JP2009/050396; Mailing Date: Mar. 3, 2009.

*Primary Examiner* — Milton I Cano
*Assistant Examiner* — Brent Thomas
(74) *Attorney, Agent, or Firm* — Finnegan, Henderson, Farabow, Garrett & Dunner, LLP

(57) ABSTRACT

A lithium-ion secondary battery of this invention comprises a separator interposed between a positive electrode and a negative electrode. Moreover, a porous film of lithium titanate is formed on the surface of the negative electrode. In this lithium-ion secondary battery, when the separator is ruptured, short-circuiting of the positive electrode and negative electrode is suppressed by the lithium titanate porous film formed on the surface of the negative electrode. Further, in this configuration, a decline in the characteristics of storage of lithium ions in the negative electrode at low temperatures (low-temperature input characteristics) is suppressed.

8 Claims, 4 Drawing Sheets

(56) References Cited

FOREIGN PATENT DOCUMENTS

| | | |
|---|---|---|
| JP | 2005-183179 | 7/2005 |
| JP | 2006-66298 | 3/2006 |
| JP | 2007-294164 | 11/2007 |
| JP | 2007-294654 | 11/2007 |
| JP | 2007-323958 | 12/2007 |

* cited by examiner

LITHIUM-ION SECONDARY BATTERY AND METHOD OF MANUFACTURING SAME

CROSS-REFERENCE TO RELATED APPLICATIONS

This application is a national phase application of International Application No. PCT/JP2009/050396, filed Jan. 14, 2009, the contents of which are incorporated herein by reference.

TECHNICAL FIELD

This invention relates to a lithium-ion secondary battery, and in particular relates to a lithium-ion secondary battery in which a separator is interposed between a positive electrode and a negative electrode.

BACKGROUND ART

In recent years, lithium-ion secondary batteries have become increasingly important as onboard power sources for vehicles, or as power sources for personal computers and portable terminals. In particular, expectations are being placed on lithium-ion secondary batteries, which are lightweight and can achieve a high energy density, as promising for use as high-output onboard power sources for vehicles. Such lithium-ion secondary batteries are configured so that, for example, a wound electrode member is formed in which a positive electrode and a negative electrode, with a separator interposed, is wound, and this wound electrode member and electrolyte are accommodated in a battery case. In this mode, if foreign matter intrudes into the wound electrode member, this foreign matter may penetrate and rupture the separator, and short-circuiting of the positive electrode and negative electrode or other phenomena may occur. So as to suppress such short-circuits, for example, in Patent Reference 1, formation of a porous insulating layer, comprising alumina, silica, titanium oxide, or similar, on the surface of the negative electrode active-material layer, is disclosed.

Although not technology having as a main objective suppression of short-circuits such as described above, Patent Reference 2 and Patent Reference 3 also disclose technologies for forming porous films on the surfaces of negative electrodes. For example, in Patent Reference 2, provision of a porous lithium film on the surface of at least one among the positive electrode and the negative electrode is disclosed. Such a porous lithium film is provided mainly with the objective of improving the battery discharge capacity. And, Patent Reference 3 discloses a lithium-ion secondary battery the negative electrode of which is pure lithium or a lithium alloy, and in which a porous insulating film is formed on the negative electrode surface opposing the positive electrode. The material for such a porous insulating film is TiN or $Al_2O_3$. Such a porous insulating film is provided mainly with the objective of preventing dendrite occurrence.

Patent Reference 1: Japanese Patent Application Laid-open No. 2005-183179
Patent Reference 2: Japanese Patent Application Laid-open No. 2002-231221
Patent Reference 3: Japanese Patent Application Laid-open No. 06-036800

In a mode in which a porous insulating layer comprising alumina, silica, titanium oxide or similar is formed on the surface of the active-material layer of the negative electrode as in Patent Reference 1, there has been a phenomenon in which the battery output drops markedly in low-temperature environments below the freezing point in particular, such as for example extremely cold environments of −30° C. or similar.

DISCLOSURE OF THE INVENTION

A lithium-ion secondary battery of this invention comprises a positive electrode, a negative electrode, and a separator interposed between the positive electrode and the negative electrode. In this lithium-ion secondary battery, a porous film of lithium titanate is formed on the surface of the negative electrode.

In this lithium-ion secondary battery, a lithium titanate porous film is formed on the surface of the negative electrode, so that by means of the insulating properties of lithium titanate, short-circuiting of the positive electrode and negative electrode is suppressed when the separator is ruptured. Further, the lithium titanate is formed as a porous film, so that at low temperatures in particular, a decline in the functions of the negative electrode for storing lithium ions or for desorbing lithium ions during charging and discharging is suppressed, and decline in the output of the lithium-ion secondary battery is suppressed.

Here, a mode may be employed in which, in the negative electrode, the active-material layer comprising the negative electrode active material is held by a collector. In this case, the lithium titanate porous film may be formed on the surface of the active-material layer of the negative electrode. Also, the lithium titanate porous film can for example be formed by evaporation deposition. Also, the thickness of the lithium titanate porous film may for example be 50 nm or greater and 1 μm or less.

DETAILED DESCRIPTION OF THE INVENTION

Figure 1:
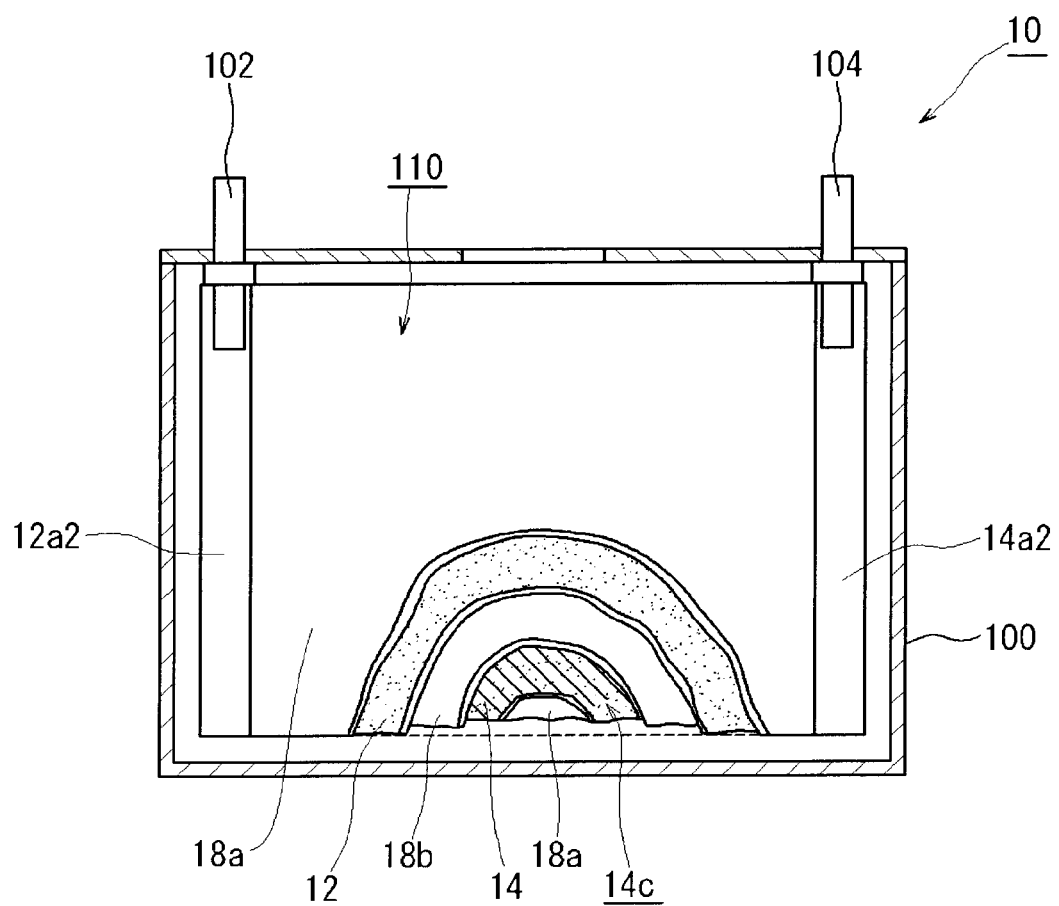
FIG. 1 shows the lithium-ion secondary battery of one embodiment of the invention.

As described above, lithium-ion secondary batteries may for example have a porous insulating layer of alumina, silica, titanium oxide, or similar formed on the surface of the active-material layer of the negative electrode, so as to suppress short-circuits between the positive electrode and the negative electrode (see for example Patent Reference 1).

However, when this inventor performed various tests and other studies, there were cases in which in such a structure, particularly in low-temperature environments below the freezing point, such as for example extremely cold environments of −30° C. or similar, the battery output dropped markedly. Upon conducting diligent studies of the origin of this phenomenon, one cause is thought to be that during charging, lithium ions are not smoothly absorbed by the negative electrode, causing the battery output to drop. That is, in a structure in which a porous insulating layer of alumina, silica, titanium oxide or similar is formed on the surface of the active-material layer of the negative electrode, lithium ions pass through the minute holes in the porous insulating layer comprising alumina, silica, titanium oxide or similar, and are stored in the negative electrode. In temperature environments from 0° C. to −30° C. and similar, resistance to movement of lithium ions in the electrolyte is increased. In such temperature environments, if a porous insulating layer comprising alumina, silica, titanium oxide, or similar is formed on the surface of the negative electrode, the resistance to lithium ions passing through the minute holes of the porous insulating layer and reaching the negative electrode is also increased. That is, in this mode the characteristics (low-temperature input characteristics) of storage of lithium ions by the negative electrode at low temperatures declines (that is, at low temperatures it becomes difficult for the negative electrode to store lithium ions). Hence it is thought that, in extremely cold environments of −30° C. and similar, a phenomenon occurs in which battery output drops markedly.

Upon engaging in such deliberations, this inventor conceived of the present invention as a novel structure to replace the above-described structure. Below, one embodiment of the invention is explained based on the drawings. In the drawings, the same symbols are assigned to members and positions with the same actions.

Figure 3:
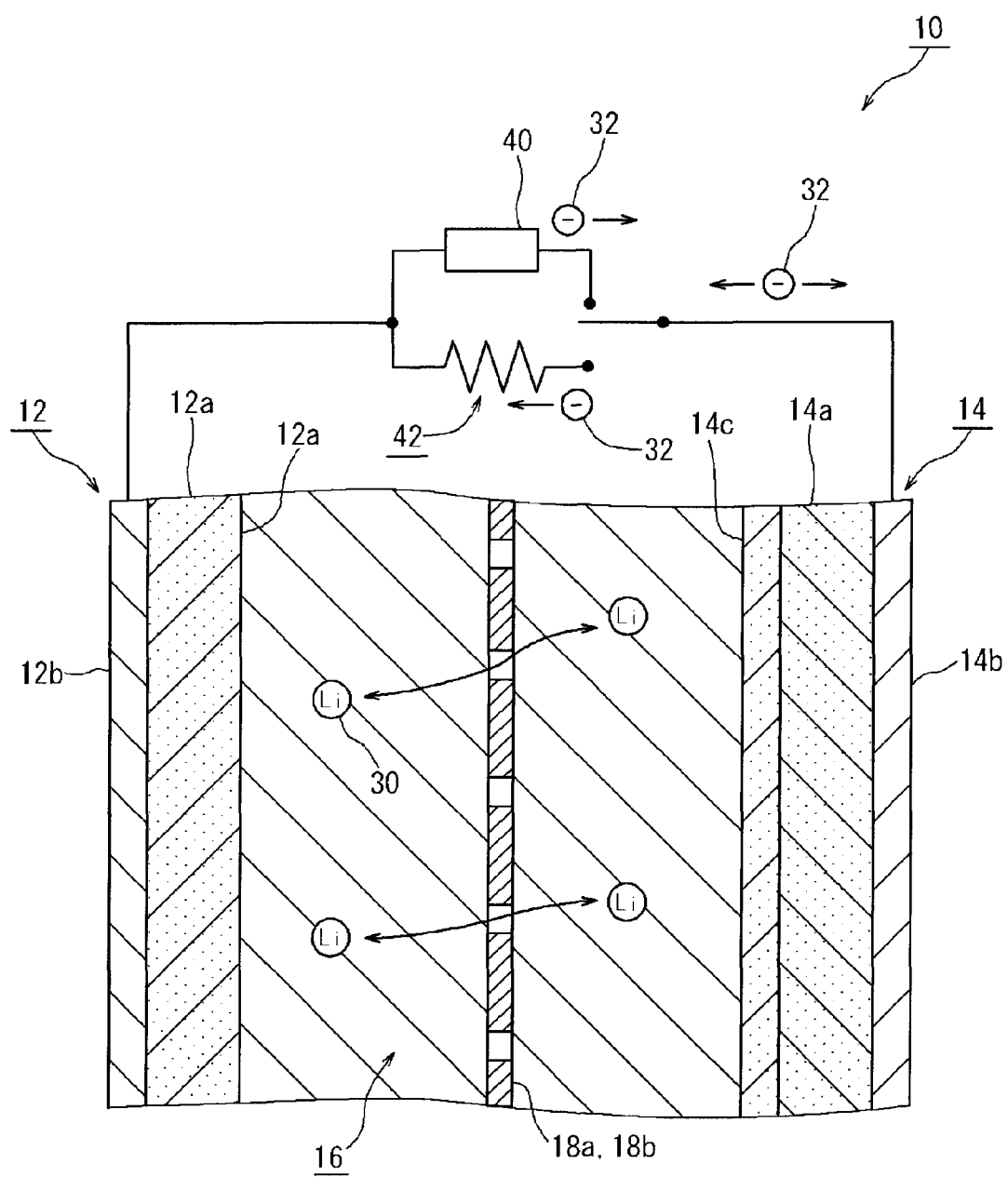
FIG. 3 schematically shows the structure of a lithium-ion secondary battery.

That is, the lithium-ion secondary battery 10 of one embodiment of this invention, as schematically shown in FIG. 3, comprises a positive electrode 12, a negative electrode 14, and separators 18a and 18b interposed between the positive electrode 12 and the negative electrode 14. And, a porous film 14c of lithium titanate is formed on the surface of the negative electrode 14. Lithium titanate has insulating properties, and because a lithium titanate porous film 14c is formed on the surface of the negative electrode 14, insulating properties between the positive electrode 12 and negative electrode 14 are secured even when the separators 18 and 18b are ruptured. Further, at low temperatures the lithium titanate porous film 14c formed on the surface of the negative electrode 14 enables lithium ions 30 to be stored more easily by the negative electrode 14. Consequently, in for example extremely cold usage environments such as −30° C., even when the lithium-ion secondary battery 10 is being charged and discharged, drops in the output of the lithium-ion secondary battery 10 can be suppressed. Below, this lithium-ion secondary battery 10 is described more specifically.

Figure 2:
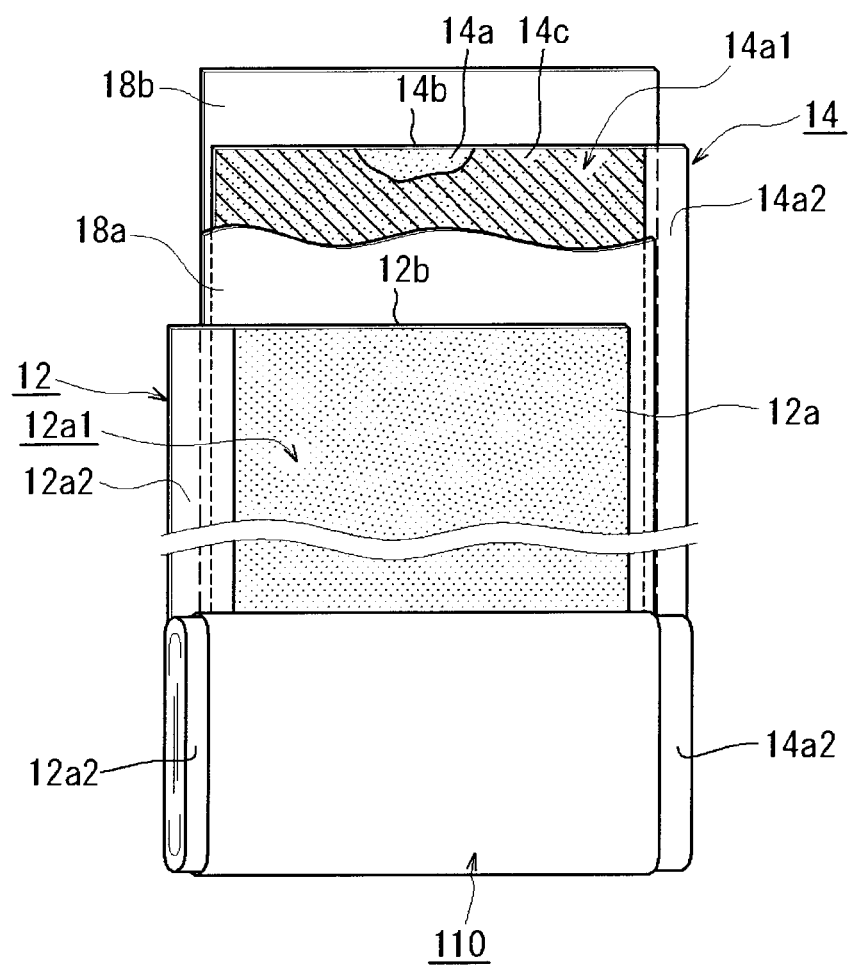
FIG. 2 shows the structure of a wound electrode member.

In this embodiment, as shown in FIG. 1, the lithium-ion secondary battery 10 comprises a rectangular metal battery case 100, a wound electrode member 110, and electrolyte. As shown in FIG. 2, the wound electrode member 110 comprises a positive electrode 12, a negative electrode 14, a first separator 18a, and a second separator 18b. And, the positive electrode 12, first separator 18a, negative electrode 14, and second separator 18b are stacked in this order and wound. The separators 18a and 18b are membranes through which ionic matter cannot pass; in this embodiment, polypropylene microporous membranes are used.

In the positive electrode 12 of this lithium-ion secondary battery 10, an active-material layer 12a comprising a positive electrode active material is held by a collector 12b. In this embodiment, the collector 12b is strip-shape collector foil comprising aluminum foil. And, in this embodiment, the positive electrode active material comprises a lithium-containing transition metal oxide. As the lithium-containing transition metal oxide, for example, lithium manganate ($LiMn_2O_4$), lithium cobalt oxide ($LiCoO_2$), lithium nickel oxide ($LiNiO_2$), and similar are used.

Further, in the negative electrode 14, an active-material layer 14a comprising a negative electrode active material is held by a collector 14b. In this embodiment, the collector 14b is strip-shape collector foil comprising copper foil. Moreover, in this embodiment, for example graphite, amorphous carbon, or other carbon-based material is used as the negative electrode active material. The negative electrode active material is not limited to a carbon-based material, and a lithium-containing transition metal oxide, transition metal nitride, and similar can also be used.

The active-material layers 12a and 14a of the positive electrode 12 and negative electrode 14 may for example be prepared by mixing the positive electrode active material or negative electrode active material with a water-based or solvent-based paste and applying to the collectors 12b and 14b respectively, and then drying. In this embodiment, as shown in FIG. 2, in the positive electrode 12 and negative electrode 14 the respective active-material layers 12a and 14a are formed disproportionately on one side in the width direction of the respective collectors 12b and 14b. Further, the active-material layers 12a and 14a are not formed on the edge portion on the opposite side of the collectors 12b and 14b in the width direction. The areas in which the active-material layers 12a and 14a are formed on the collectors 12b and 14b are called the applied portions 12a1 and 14a1. And, the areas in which the active-material layers 12a and 14a are not formed on the collectors 12b and 14b are called the unapplied portions 12a2 and 14a2. The applied portion 12a1 of the positive electrode 12 and the applied portion 14a1 of the negative electrode 14 are opposed, enclosing the separators 18a and 18b. Further, on both sides in the direction perpendicular to the winding direction (the winding axis direction) of the wound electrode member 110, the unapplied portions 12a2 and 14a2 of the positive electrode 12 and negative electrode 14 protrude from the separators 18a and 18b respectively.

Further, in this embodiment, as shown in FIG. 2, a lithium titanate ($Li_4Ti_5O_{12}$) porous film 14c is formed on the surface of the negative electrode 14 (the negative electrode active material surface).

In this embodiment, the lithium titanate porous film 14c is formed by evaporation deposition. The thickness of the lithium titanate porous film 14c may for example be 50 nm or higher and 1 μm or lower. The thickness of the lithium titanate porous film 14c need only be sufficient to enable reliable prevention of short-circuits between the positive electrode 12 and the negative electrode 14. Further, the thickness of the lithium titanate porous film 14c should be of a thickness which does not impede entry of lithium ions 30 into the active-material layer 14a during charging, and so from this standpoint should not be too thick. In this embodiment, the lithium titanate porous film 14c is deposited so that the thickness is from 100 nm to 300 nm. The thickness of the lithium titanate porous film 14c may be adjusted appropriately according to the specific structure of the lithium-ion secondary battery 10 so as to obtain the functions of the lithium titanate porous film 14c.

Further, in this embodiment the porous film 14c is deposited in a low-vacuum state so that the film deposition rate is comparatively high, and moreover an appropriate porous film is formed. Specifically, in this embodiment, film deposition was performed using an AAMF-C1650SPB manufactured by Shinko Seiki Co. Ltd. as the film deposition device. Film deposition was performed with film deposition conditions, for this device, of a final vacuum of from 2 to $4 \times 10^{-5}$ Torr, power (output) of 10 kV, emission current of 30 mA, film deposition rate of 5 Å/sec, and film deposition temperature of room temperature. In this film deposition device, the negative electrode 14 was transported by rollers while depositing the lithium titanate porous film 14c onto the surface of the negative electrode 14. In this embodiment, the rollers transporting the collector 14b were cooled appropriately, in order to cool the collector 14b onto which the porous film 14c is deposited by a proper amount. By this means, the temperature of the collector 14b during film deposition can be kept at an appropriate temperature. In this embodiment, through such film deposition conditions, an appropriate porous film 14c for which insulating properties are secured, and which does not impede the characteristics of input of lithium ions 30 (that is, the characteristics of storage of lithium ions 30 in the active-material layer 14a of the negative electrode 14), can be obtained. By means of such conditions, the film deposition rate can be made comparatively high, and the time for the film deposition process can be shortened.

The above film deposition conditions are examples of film deposition conditions appropriate for forming a lithium titanate porous film 14c on a negative electrode 14. The film deposition conditions for forming the lithium titanate porous film 14c on the negative electrode 14 are not limited to the above conditions. The film deposition conditions for forming the lithium titanate porous film 14c may be based on the above film deposition conditions, but additionally adjusted to conditions appropriate to obtain a desired porous film 14c. For example, the film deposition device is merely one example of a device appropriate for forming a lithium titanate porous film 14c on a negative electrode 14, and other film deposition devices can be used to perform film deposition. Also, when using other film deposition devices, the film deposition conditions may be adjusted appropriately.

As shown in FIG. 1, the wound electrode member 110 is accommodated in the battery case 100. As shown in FIG. 1, a positive electrode terminal 102 and negative electrode terminal 104 are provided on the battery case 100. The positive electrode terminal 102 is electrically connected to the unapplied portion 12a2 of the collector 12b (see FIG. 2) of the wound electrode member 110. The negative electrode terminal 104 is electrically connected to the unapplied portion 14a2 of the collector 14b (see FIG. 2) of the wound electrode member 110. Electrolyte is injected into this battery case 100. The electrolyte can comprise a non-aqueous electrolyte, such as a mixed solvent such as diethyl carbonate or ethylene carbonate containing an appropriate amount of an appropriate electrolyte salt (for example $LiPF_6$ or another lithium salt). This lithium-ion secondary battery 10 is charged and discharged via the positive electrode terminal 102 and the negative electrode terminal 104. During charging and discharging, lithium ions move back and forth between the positive electrode 12 and the negative electrode 14.

FIG. 3 schematically shows the lithium-ion secondary battery 10. This lithium-ion secondary battery 10 comprises a positive electrode 12, negative electrode 14, and separators 18a and 18b, as shown in FIG. 3. The positive electrode 12 and negative electrode 14 are opposed, with the separators 18a and 18b, in a state of immersion in the electrolyte 16, therebetween.

In the lithium-ion secondary batter 10 during charging, as shown schematically in FIG. 3, the collector 12b of the positive electrode 12 and the collector 14b of the negative electrode 14 are connected to a charger 40. During this charging, lithium from the active-material layer 12a comprising positive electrode active material containing lithium is ionized when charge 32 is discharged from the positive electrode collector 12b. The charge 32 discharged from the positive electrode collector 12b moves through the action of the charger 40 to the collector 14b of the negative electrode 14. The lithium ions 30 move through the electrolyte 16. The lithium ions are positive ions, and are electrically attracted to the charge 32 accumulated on the collector 14b of the negative electrode 14, passing through the separators 18a and 18b and moving to the side of the negative electrode 14. Lithium ions 30 which have moved to the side of the negative electrode 14 pass through the lithium titanate porous film 14c and are stored in the active-material layer 14a comprising negative electrode active material of the negative electrode 14.

Further, in the lithium-ion secondary battery 10 during discharging, as shown schematically in FIG. 3, the collector 12b of the positive electrode 12 and the collector 14b of the negative electrode 14 are connected to a resistor 42. During this discharge, charge 32 accumulated on the collector 14b of the negative electrode 14 passes through the resistor 42 and returns to the positive electrode 12. Also, in the negative electrode 14, lithium ions 30 stored in the active-material layer 14a are discharged into the electrolyte. The lithium ions 30 pass through the separators 18a and 18b and move to the side of the positive electrode 12. And, the lithium ions 30 take in charge 32 from the active-material layer 12a of the positive electrode 12.

In this lithium-ion secondary battery 10, such charging and discharging is repeated as appropriate between the positive electrode 12 and the negative electrode 14. During charging and discharging, lithium ions 30 move back and forth between the active-material layer 12a of the positive electrode 12 and the active-material layer 14a of the negative electrode 14, through the separators 18a and 18b. The environment of manufacture of this lithium-ion secondary battery 10 is strictly controlled, and manufacture is performed such that foreign matter is not included within the battery. When foreign matter is included in the lithium-ion secondary battery 10, lithium ions 30 may segregate in the foreign matter between the positive electrode 12 and negative electrode 14. Further, lithium segregated on foreign matter may gradually grow, and become a cause of rupture of the separators 18a and 18b. If the separators 18a and 18b rupture, there is the concern of short-circuits between the positive electrode 12 and the negative electrode 14.

In a lithium-ion secondary battery 10 of this embodiment, a lithium titanate porous film 14c is provided on the surface of the active-material layer 14a of the negative electrode 14. Lithium titanate is a material with insulating properties, and can secure insulation between the positive electrode 12 and the negative electrode 14 and suppress short-circuits between the positive electrode 12 and the negative electrode 14 even if for some reason the separators 18a and 18b are ruptured. That is, in a state in which charge 32 is accumulated on the negative electrode 14, if for some reason the separators 18a and 18b are ruptured and the positive electrode 12 comes into contact with the negative electrode 14, charge 32 accumulated on the negative electrode 14 is concentrated at the place of contact. At this time, because in this embodiment a lithium titanate porous film 14c having insulating properties is provided on the surface of the active-material layer 14a of the negative electrode 14, there is no direct flow of a large current from the negative electrode 14 to the positive electrode 12. By this means, local short-circuits between the positive electrode 12 and the negative electrode 14 can be suppressed. In this way, the lithium titanate porous film 14c has the function of securing insulation between the positive electrode 12 and the negative electrode 14, and also functions as a thermal resistance film.

Figure 4:
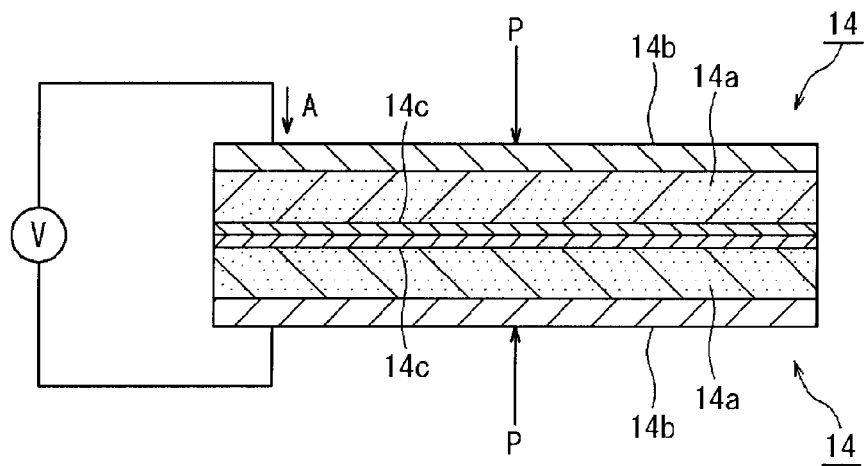
FIG. 4 is a summary view of tests relating to the insulating properties of a lithium titanate porous film; and,
FIG. 5 is a side view showing a vehicle in which is mounted a lithium-ion secondary battery, as an onboard power source for the vehicle.

In order to verify the advantageous result of preventing short circuits (the advantageous result of insulating properties) through formation of a lithium titanate porous film 14c on the surface of the negative electrode 14, the inventor performed tests as shown in FIG. 4. In these tests, two negative electrode 14 were prepared. And as shown in FIG. 4, the two electrodes 14 were stacked, with the faces on which the active-material layers 14a were formed in opposition. Then, pressing was performed with a prescribed pressure P (in this embodiment, 1 MPa) applied, and a prescribed current A (in this embodiment, 1 A) was passed through the collectors 14b in opposition with the active-material layers 14a enclosed. At this time, a voltmeter V was installed between the opposed collectors 14b, and from the voltage measured when the current A was passed, the resistance occurring across the opposed collectors 14b was determined. These tests were performed for negative electrodes 14 with an active-material layer 14a containing graphite (negative electrode active material) on the collector 14b, and for negative electrodes 14 with a lithium titanate porous film 14c formed on the surface of the active-material layer 14a. FIG. 4 shows in summary the tests performed for negative electrodes 14 with lithium titanate porous films 14c formed on the surfaces of the active-material layers 14a. A summary diagram of tests for negative electrodes 14 with no lithium titanate porous film 14c formed is omitted.

In this case, the electrical resistance at the time of short circuit of the positive electrode is markedly higher for a negative electrode 14 with a lithium titanate porous film 14c formed on the surface of the active-material layer 14a, compared with a negative electrode 14 with no lithium titanate porous film 14c formed. For example, when copper foil of thickness 9 μm was used as the collector 14b, the thickness of the active-material layer 14a was 20 μm, and the thickness of the lithium titanate porous film 14c was 250 nm, the resistance value of the negative electrode 14 with the lithium titanate porous film 14c formed was 3.9Ω. On the other hand, the resistance value of a negative electrode 14 with no lithium titanate porous film 14c formed was 0.3Ω. In this way, by forming a lithium titanate porous film 14c on the active-material layer 14a, the resistance is increased, and the required insulating properties are obtained.

Further, at low temperatures, movement of lithium ions during charging and discharging is aided by the lithium titanate porous film 14c. For example, even for example in an extremely cold environment at −30° C. or similar, lithium ions 30 in the electrolyte 16 are quickly absorbed by the active-material layer 14a of the negative electrode 14.

This phenomenon is inferred to occur as follows. That is, in a normal-temperature environment at for example approximately 20° C., the charge/discharge potential of the carbon-based material used as the negative electrode active material is approximately 0.3 V, and the charge/discharge potential of the lithium titanate ($Li_4Ti_5O_{12}$) is approximately 1.5 V. Hence at normal temperatures, the lithium titanate does not contribute to charging or discharging. However, at low temperatures, the overvoltage (resistance) rises. That is, there are cases in which the negative electrode potential rises above the 0.3 V which is the charge/discharge potential of the carbon-based material. In this case, at low temperatures (for example, extremely cold environments of −30° C. or similar), insertion of lithium ions ($Li^+$) into the carbon-based material used as the negative electrode active material is impeded. And, the negative electrode potential rises to 1.5 V, which is the charge/discharge potential of the lithium titanate. In this way, in a lithium-ion secondary battery 10 in which a lithium titanate porous film 14c is provided on the surface of the active-material layer 14a of the negative electrode 14, even in low-temperature usage environments, the lithium titanate contributes to charging and discharging suitably. Hence a drop in the input characteristics of the lithium-ion secondary battery 10 is suppressed even in extremely cold usage environments.

Thus in this lithium-ion secondary battery 10, a lithium titanate porous film 14c is formed on the surface of the negative electrode 14, so that when the separators are ruptured, short-circuits between the positive electrode and the negative electrode are suppressed. Further, even in low-temperature environments such as for example 0° C. to −30° C., lithium ions are stored comparatively quickly in the active-material layer 14a of the negative electrode 14. This inventor compared a lithium-ion secondary battery 10 in which a lithium titanate porous film 14c was formed on the surface of the negative electrode 14, with a lithium-ion secondary battery in which no lithium titanate porous film 14c was formed on the surface of the negative electrode 14.

In this case, upon charging to 60% in a −30° C. temperature environment, an input of 9.4 W was obtained for the lithium-ion secondary battery 10 in which a lithium titanate porous film 14c was formed on the surface of the negative electrode 14. On the other hand, the input was 8.0 W for the lithium-ion secondary battery in which no lithium titanate porous film 14c was formed on the surface of the negative electrode 14.

As explained above, this lithium-ion secondary battery 10 comprises separators 18a and 18b interposed between the positive electrode 12 and the negative electrode 14, as shown in FIG. 3. And, a lithium titanate porous film 14c is formed on the surface of the negative electrode. In this lithium-ion secondary battery 10, by means of the lithium titanate porous film 14c formed on the surface of the negative electrode 14, short-circuits between the positive electrode 12 and the negative electrode 14 are suppressed when the separators 18a and 18b are ruptured. Further, in this mode, the characteristics of storage of lithium ions by the negative electrode at low temperatures (low-temperature input characteristics) are improved. In particular, during charging and discharging in extremely low-temperature environments at −30° C. or similar, a decline in the functions of the negative electrode 14 to store lithium ions 30, or to desorb lithium ions 30, is suppressed. In this way, the low-temperature input characteristics of the lithium-ion secondary battery 10 are improved compared with a case in which no lithium titanate porous film 14c is formed on the surface of the negative electrode, and a decline in the output of the lithium-ion secondary battery 10 at low temperatures is suppressed.

Further, as described above, a mode can be adopted for the negative electrode 14 in which an active-material layer 14a comprising negative electrode active material is held by a collector 14b. In this case, the lithium titanate porous film 14c may be formed on the surface of the active-material layer 14a of the negative electrode 14. In this way, the lithium titanate porous film 14c is formed on the surface of the active-material layer 14a of the electrode 14, so that insulating properties can be reliably secured when the separators 18a and 18b are ruptured. Further, in a low-temperature usage environment, the input characteristics of lithium ions 30 to the active-material layer 14a are improved.

Further, as the negative electrode active material comprised by the active-material layer 14a, a carbon-based material (for example, graphite carbon or similar) may be used. Also, the lithium titanate porous film 14c may be formed by evaporation deposition, as described above. By means of this evaporation deposition method, the lithium titanate porous film 14c can be formed to an appropriate thickness of 50 nm to 1 μm or similar. Further, a film in a suitable porous state can be formed by adjusting film deposition conditions. By this means, in a low-temperature usage environment, a decline in the input of lithium ions 30 to the active-material layer 14a can be prevented, appropriately and more reliably. Further, as a method other than evaporation deposition, the lithium titanate porous film 14c can also be formed by application. However, if an evaporation deposition method is used, a film in an appropriately porous state can easily be deposited more appropriately, more reliably, and more thinly, than by application. Further, in other film deposition methods such as sputtering or ion plating, there is a tendency to form a fine-textured film. On the other hand, in methods to form porous films 14c by application, the three processes of mixing, application, and drying are required, so that the number of process tasks is increased. In particular, the drying process requires time, and much energy is necessary for the drying furnace. Further, in application a binder (binding agent) penetrates into the electrode, so that there is also the problem that reaction resistance is worsened.

On the other hand, an evaporation deposition method employs the above-described film deposition device, and such processes as mixing and drying are unnecessary. Further, an evaporation deposition method can be used to form film in the desired porous state by adjusting the film deposition conditions, and a thin porous film can be formed easily compared with methods employing application. Also, thin porous films 14c can be formed, so that the material costs of the lithium titanate can be reduced. By means of such an evaporation deposition method, manufacturing costs can be greatly reduced, and an appropriate lithium titanate porous film 14c can be formed. As a method for forming such a lithium titanate porous film 14c, an evaporation deposition method is preferable compared with these other methods.

In the above, the lithium-ion secondary battery of an embodiment of the invention has been explained; however, lithium-ion secondary batteries of this invention are not limited to the above-described embodiment.

For example, the materials of the collectors, positive electrode active material, negative electrode active material, and separators of the lithium-ion secondary battery are not limited to those of the above-described embodiment. As the materials of the collectors, positive electrode active material, negative electrode active material, and separators of the lithium-ion secondary battery, any appropriate materials may be adopted.

Figure 5:
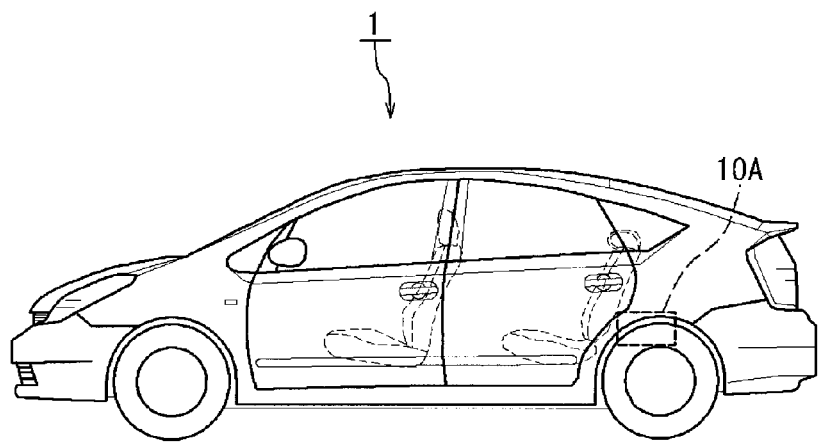

Further, such lithium-ion secondary batteries 10 are used in a various of applications, such as vehicle onboard power sources, or the power sources of personal computers and portable terminals, and similar. For example, as a vehicle onboard power source, a plurality of batteries may be combined in a battery pack 10A, which is installed as the power source of a vehicle 1, as shown in FIG. 5. In the power source of a vehicle, charging and discharging are repeated. Further, the power source of a vehicle must stably exhibit the required input even in cold regions and other usage environments below the freezing point. In a lithium-ion secondary battery 10 of the embodiment of the invention, the required input characteristics can be secured and declines in output suppressed even in usage environments below the freezing point, as described above. Hence such secondary batteries are useful as onboard power sources for vehicles.

Industrial Applicability

By means of a configuration of this invention, a lithium-ion secondary battery can be provided in which short-circuits between the positive electrode and negative electrode can be prevented, and low-temperature input characteristics are improved.

The invention claimed is:

1. A lithium-ion secondary battery, comprising a positive electrode, a negative electrode, and a separator interposed between said positive electrode and said negative electrode, wherein a porous film containing lithium titanate only, and having insulating properties, is formed on the surface of said negative electrode.

2. The lithium-ion secondary battery according to claim 1, wherein, in said negative electrode, an active-material layer including negative electrode active material is held by a collector, and said porous film of lithium titanate is formed on the surface of the active-material layer of the negative electrode.

3. The lithium-ion secondary battery according to claim 2, wherein said negative electrode active material is a carbon-based material.

4. The lithium-ion secondary battery according to Claim 1, wherein said porous film of lithium titanate is formed by evaporation deposition.

5. The lithium-ion secondary battery according to claim 1, wherein the thickness of said porous film of lithium titanate is 50 nm or greater and 1 μm or less.

6. A vehicle, comprising the lithium-ion secondary battery according to claim 1.

7. A method of manufacturing a lithium-ion secondary battery having a positive electrode, a negative electrode, and a separator interposed between said positive electrode and said negative electrode,
the method comprising a porous film formation step of forming a porous film containing lithium titanate only, and having insulating properties, on the surface of said negative electrode.

8. The method of manufacturing a lithium-ion secondary battery according to claim 7, wherein, in said porous film formation step, said porous film of lithium titanate is formed by an evaporation deposition method.

* * * * *